(12) United States Patent
Tang et al.

(10) Patent No.: US 11,251,493 B2
(45) Date of Patent: Feb. 15, 2022

(54) BATTERY PACK

(71) Applicant: Contemporary Amperex Technology Co., Limited, Ningde (CN)

(72) Inventors: Yu Tang, Ningde (CN); Yanbo Chen, Ningde (CN); Yongguang Wang, Ningde (CN); Peng Wang, Ningde (CN); Kaijie You, Ningde (CN); Xingdi Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 62 days.

(21) Appl. No.: 16/994,247

(22) Filed: Aug. 14, 2020

(65) Prior Publication Data
US 2021/0066677 A1    Mar. 4, 2021

(30) Foreign Application Priority Data
Aug. 27, 2019 (CN) .......................... 201910794640.7

(51) Int. Cl.
*H01M 50/20* (2021.01)
*H01M 50/10* (2021.01)
*F16B 37/06* (2006.01)

(52) U.S. Cl.
CPC ........... *H01M 50/20* (2021.01); *H01M 50/10* (2021.01); *F16B 37/067* (2013.01)

(58) Field of Classification Search
None
See application file for complete search history.

(56) References Cited

U.S. PATENT DOCUMENTS

| 8,795,867 B2 | 8/2014 | Kim |
| 9,876,260 B2 | 1/2018 | Kim et al. |
| 2005/0242774 A1 | 11/2005 | Marraffa |
| 2020/0152928 A1 | 5/2020 | Cai et al. |
| 2021/0036278 A1 | 2/2021 | Tang et al. |

(Continued)

FOREIGN PATENT DOCUMENTS

| CN | 102104122 A | 6/2011 |
| CN | 105489810 A | 4/2016 |
| CN | 105826492 A | 8/2016 |

(Continued)

OTHER PUBLICATIONS

International Search Report issued in International Application No. PCT/CN2020/097402, dated Sep. 16, 2020, 8 pages.

*Primary Examiner* — Wyatt P McConnell
(74) *Attorney, Agent, or Firm* — Sterne, Kessler, Goldstein & Fox P.L.L.C.

(57) ABSTRACT

A battery pack, includes a box assembly including a box body and a plurality of fixed beams, a plurality of battery modules, and a plurality of constraint components, each of which includes a limiting portion, a first mounting portion and a second mounting portion. The first mounting portion is provided with a plurality of first mounting holes along a length direction of the fixed beams. The second mounting portion is provided with a plurality of second mounting holes along the length direction. A plurality of first fasteners respectively pass through the first mounting holes and are fixed to one fixed beam. A plurality of second fasteners respectively pass through the second mounting holes and are fixed to the other fixed beam. The first mounting hole and the second mounting hole have different adjustment amounts in the arrangement direction.

14 Claims, 10 Drawing Sheets

(56) References Cited

U.S. PATENT DOCUMENTS

2021/0066677 A1 3/2021 Tang et al.

FOREIGN PATENT DOCUMENTS

| CN | 106601958 A | 4/2017 |
|----|-------------|--------|
| CN | 107658401 A | 2/2018 |
| CN | 207558892 U | 6/2018 |
| CN | 209000986 U | 6/2019 |
| CN | 209963117 U | 1/2020 |
| CN | 209963118 U | 1/2020 |
| CN | 111106279 A | 5/2020 |
| CN | 111106282 A | 5/2020 |
| EP | 3506386 A1  | 7/2019 |
| JP | 201681857 A | 5/2016 |
| JP | 2018063913 A | 4/2018 |

BATTERY PACK

CROSS-REFERENCE TO RELATED APPLICATIONS

The present application claims priority of Chinese application No. 201910794640.7, filed on Aug. 27, 2019. The disclosed content of the Chinese application is hereby entirely incorporated into the present disclosure by reference thereto.

FIELD

The present disclosure relates to the field of battery technology, and in particular, to a battery pack.

BACKGROUND

In recent years, rechargeable batteries have been widely applied to supply power to vehicles. A plurality of rechargeable batteries are connected in series, parallel, or hybrid to achieve a great capacity or power.

During actual use, it has been found that the battery pack sometimes has a short circuit problem after a long time of use.

SUMMARY

The present disclosure provides a battery pack, including:

a box assembly, including a box body and a plurality of fixed beams, wherein the plurality of fixed beams are fixed in the box body and divide the box body into a plurality of accommodation cavities;

a plurality of battery modules, each of which including a plurality of battery units, and the plurality of battery modules are respectively arranged in the plurality of accommodation cavities;

a plurality of constraint components, each of which including a limiting portion, a first mounting portion, and a second mounting portion, wherein the limiting portion covers one of the plurality of battery modules, the first mounting portion and the second mounting portion are respectively connected to both sides of the limiting portion along an arrangement direction of the plurality of fixed beams, and respectively fixed to two of the plurality of fixed beams at both sides of the one of the plurality of battery module; the first mounting portion is provided with a plurality of first mounting holes at intervals along a length direction of the plurality of fixed beams, and the second mounting portion is provided with a plurality of second mounting holes at intervals along the length direction of the plurality of fixed beams;

a plurality of first fasteners, which respectively pass through the first mounting holes and are fixed to one of the two of the plurality of fixed beam corresponding to the first mounting portion;

a plurality of second fasteners, which respectively pass through the second mounting holes and are fixed to the other of the two of the plurality of fixed beam corresponding to the second mounting portion, and wherein each of the plurality of first mounting holes and each of the plurality of second mounting holes have different adjustment amounts in the arrangement direction of the plurality of fixed beams.

In some embodiments, each of the plurality of first mounting holes is a circular hole, and each of the plurality of second mounting holes is provided with an opening away from the limiting portion, wherein the opening penetrates in a thickness direction of the second mounting portion, and a size of the opening in the length direction of the plurality of fixed beams is no less than a diameter of a first connecting section of each of the plurality of second fasteners.

In some embodiments, a length size L of each of the plurality of second mounting holes along the arrangement direction of the plurality of fixed beams is greater than the diameter of the first connecting section of each of the plurality of second fasteners.

In some embodiments, a diameter of each of the plurality of first mounting holes is the same as that of an arcuate section of each of the plurality of second mounting holes.

In some embodiments, each of the plurality of first mounting hole is a circular hole, and each of the plurality of second mounting hole is an oblong hole extending along the arrangement direction of the plurality of fixed beams.

In some embodiments, each of the plurality of fixed beams is provided with a plurality of third mounting holes at intervals along the length direction thereof, and each of the plurality of third mounting holes is a threaded hole; and wherein each of the plurality of first fasteners sequentially passes through one of the plurality of first mounting holes and one of the plurality of third mounting holes and is fixed to one of the plurality of fixed beams corresponding to the first mounting portion.

In some embodiments, each of the plurality of fixed beams is provided with a plurality of third mounting holes at intervals along the length direction thereof, and each of the plurality of third mounting holes is a threaded hole; and wherein each of the plurality of second fasteners sequentially passes through one of the plurality of second mounting holes and one of the plurality of third mounting holes and is fixed to one of the plurality of fixed beams corresponding to the second mounting portion.

In some embodiments, each of the plurality of fixed beams is provided with a plurality of third mounting holes at intervals along the length direction thereof, wherein each of the plurality of third mounting holes is a through hole;

the battery pack including a plurality of blind rivet nuts which includes a second connecting section and a second limiting portion, wherein the second connecting section of each of the plurality of blind rivet nuts is correspondingly embedded in each of the plurality of third mounting holes, and the second limiting portion is in contact with a side of the fixed beam facing the constraint component; and each of the plurality of first fasteners sequentially passes through one of the plurality of first mounting holes and an inner hole of one of the plurality of blind rivet nuts, and is fixed to one of the plurality of fixed beams corresponding to the first mounting portion.

In some embodiments, a diameter of each of the plurality of first mounting holes is greater than a profile size of the second limiting portion.

In some embodiments, each of the plurality of fixed beams is provided with a plurality of third mounting holes at intervals along the length direction thereof, wherein each of the plurality of third mounting holes is a through hole;

the battery pack including a plurality of blind rivet nuts which includes a second connecting section and a second limiting portion, wherein the second connecting section of each of the blind rivet nuts is correspondingly embedded in each of the third mounting holes, and the second limiting portion is in contact with a side of the fixed beam facing the constraint component; and each of the plurality of second fasteners sequentially passes through one of the plurality of second mounting holes and an inner hole of one of the plurality of blind rivet nuts and is fixed to one of the plurality of fixed beams corresponding to the second mounting portion.

In some embodiments, a diameter of an arcuate section of each of the plurality of second mounting holes is greater than a profile size of the second limiting portion.

In some embodiments, for two adjacent constraint components, the first mounting portion of one constraint component and the second mounting portion of another constraint component are fixed to the same fixed beam through the same group of the first fasteners or second fasteners, and stacked in a height direction.

In some embodiments, the first mounting portion is located above the second mounting portion stacked with the first mounting portion in the height direction.

BRIEF DESCRIPTION OF THE DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the accompanying drawings.

REFERENCE SIGNS 1, box assembly; 11, box; 12, fixed beam; 121, third mounting hole; 122, weight reduction slot; 13, accommodating cavity;

2, battery cell; 20, battery module; 21, housing; 22, electrode assembly; 221, first pole piece; 222, second pole piece; 223, diaphragm; 224, flat surface; 23, adapter piece 24, cover plate assembly; 241, cover plate; 242, first electrode terminal; 243, second electrode terminal;

3, constraint component; 3A, first constraint component; 3B, second constraint component; 3C, third constraint component; 3D, fourth constraint component; 3E, fifth constraint component; 31, limiting portion; 32A, first mounting portion; 32B, second mounting portion; 321, first mounting hole; 322, second mounting hole; 323, opening;

4A, first fastener; 4B, second fastener; 41, connecting section; 42, first limiting portion;

5, blind rivet nut; 51, second connecting section; 52, second limiting portion;

6, outer cover.

DETAILED DESCRIPTION

The present disclosure will be explained in detail below. In the following paragraphs, different aspects of the embodiments will be defined in more detail. Each aspect thus defined may be combined with any other aspect or aspects unless it is specifically indicated that combination is impossible. In particular, any feature that is considered to be preferred or advantageous may be combined with one or more other features that are considered to be preferred or advantageous.

The terms "first" and "second" recited in the present disclosure are merely for ease of description, to distinguish different constituent parts having the same name, rather than indicating a sequential or primary-secondary relationship.

In addition, when an element is referred to as being "on" another element, it may be directly on another element, or one element or may be indirectly on another element with one or more intermediate elements therebetween. In addition, when an element is referred to as being "connected to" another element, the element may be directly connected to another element, or may be indirectly connected to another element with one or more intermediate elements therebetween. In the following, the same reference numerals present the same elements.

In the present disclosure, "a plurality of" refers to two or more (including two), and similarly, "a plurality of groups" refers to two or more groups (including two groups), and "a plurality of pieces" refers to two or more pieces (including two pieces).

In order to clearly describe each orientation in the following embodiments, for example, the coordinate systems in FIGS. 1 and 11 define each direction of the battery pack, wherein the x direction represents a length direction of the battery pack (hereinafter referred to as a length direction for short); the y direction represents a width direction of the battery pack (hereinafter referred to as a width direction for short); the z direction which is perpendicular to a plane formed by the x and y directions, represents a height direction of the battery pack (hereinafter referred to as a height direction for short). Based on such orientation definition, "up", "down", "top", and "bottom" are all relative to a height direction.

During actual use, it has been found that the battery pack sometimes has a short circuit problem after a long time of use. It has been noticed that the outer cover of the battery pack has a large area and a poor rigidity, and the battery cell may expand during the charging or discharging process, thereby causing that the outer cover of the battery pack is seriously deformed. After the outer cover of the battery pack is deformed, the sealing property of the outer cover and the box may be reduced, thereby result in that external water vapor enters the battery pack to cause a short circuit problem.

To solve this problem, the embodiments of the present disclosure provide a battery pack which can improve the sealing property of the battery pack.

The battery pack according to some embodiments of the present disclosure may provide a stable and effective pressing force to battery modules and reduce the expansion and deformation degree of the battery module by providing a constraint component fixed to a fixed beam; and a first mounting hole and a second mounting hole on both sides of the constraint component have different adjustment amounts, which may solve the problem of difficult assembly resulting from a fitting error between the constraint component and the fixed beam when the constraint component is mounted on the fixed beam, thereby improving the assembly efficiency of the battery pack, and reducing the requirements for the accuracy of machining parts so as to reduce the production cost. In addition, it is also possible to release a connection stress produced between the fastener and the mounting hole.

Figure 1:
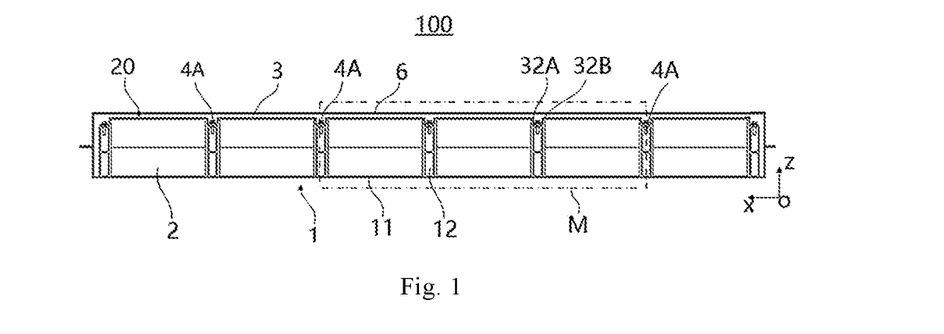
FIG. 1 is a schematic view of an overall structure of a battery pack cut along an xz plane according to some embodiments of the present disclosure.

FIG. 1 is a schematic view of an overall structure of a battery pack of the present disclosure. The battery pack 100 includes a box assembly 1, a plurality of battery modules 20, a plurality of constraint components 3, a plurality of first fasteners 4A, and a plurality of second fasteners 4B.

Figure 2:
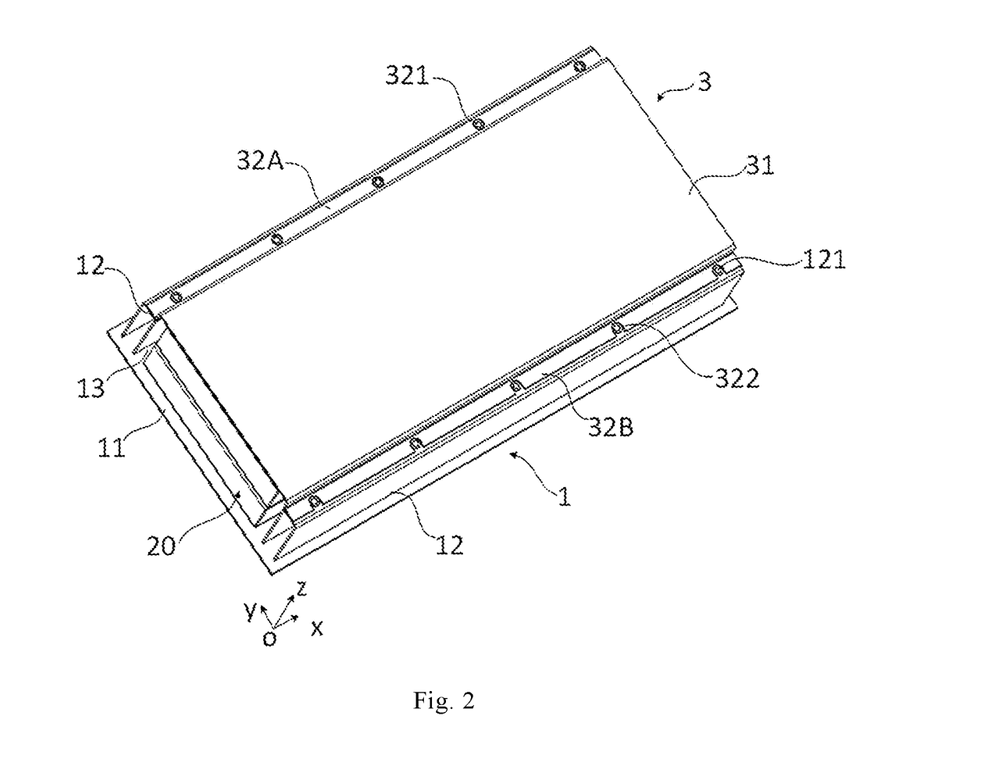
FIG. 2 is a schematic structural view of a battery pack according to some embodiments of the present disclosure, in which a constraint component is mounted on a fixed beam.

As shown in FIGS. 1 and 2, the box assembly 1 includes a box body 11 and a plurality of fixed beams 12. The box body 11 has an open end. The fixed beams 12 are fixed in the box body 11 and divide the box body 11 into a plurality of accommodation cavities 13. For example, the fixed beam 12 may be fixed on the inner bottom surface or the side wall of the box body 11. In order to reduce the weight of the box assembly 1, the fixed beam 12 may use a hollow structure. Alternatively, as shown in FIG. 2, the fixed beam 12 is formed by folding a sheet metal structure; or, as shown in FIG. 11, the fixed beam 12 is internally provided with a weight reduction slot 122. The cross section of the fixed beam 12 may be rectangular, trapezoidal, or C-shaped and the like, and the upper surface thereof may be provided to be a flat surface, so as to fix the constraint component 3 on the upper surface of the fixed beam 12. Alternatively, the constraint component 3 may also be fixed to a lateral surface of the fixed beam 12.

As shown in FIG. 1, the battery pack may further include an outer cover 6, which is disposed on one side of the constraint component 3 away from the battery module 20 and closes the open end of the box body 11. Closing the open end of the box body 11 here refers to a sealed connection between the outer cover 6 and the box body 11, which may prevent external liquid and water vapor from entering the battery pack and improve the safety performance of the battery pack.

Figure 11:
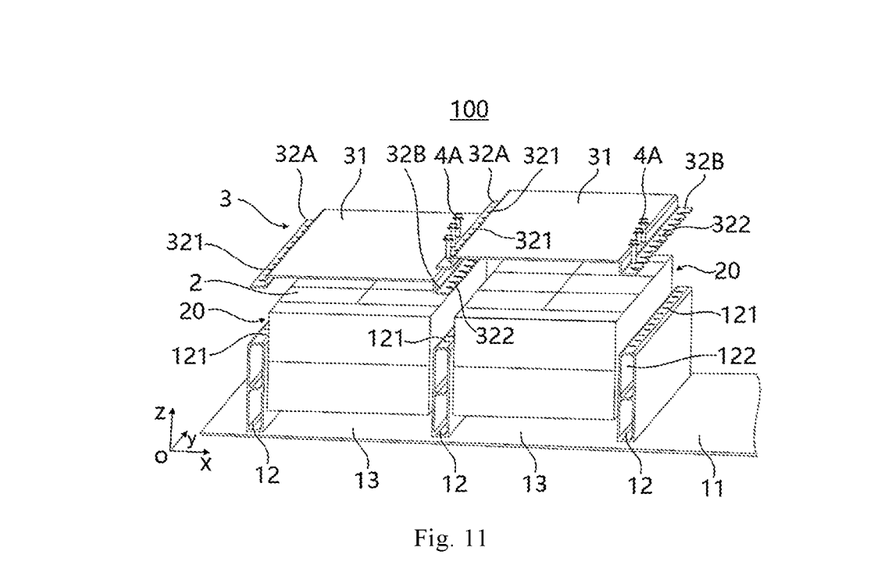
FIG. 11 is an exploded view of a battery pack according to some embodiments of the present disclosure, in which a first mounting portion and a second mounting portion of adjacent constraint components are arranged in a stack in a z direction.

As shown in FIGS. 1 and 11, each battery module 20 includes a plurality of battery units 2. For example, the battery module 20 may be provided with one layer or a plurality of stacked layers of battery units 2 along the height direction. Alternatively, the battery module 20 may also be provided with at least two or more battery units 2 arranged along the length and/or width direction. The battery modules 20 are respectively arranged in the accommodating cavities 13, and only one battery module 20 is arranged in each accommodating cavity 13. For example, the size of the accommodating cavity 13 is adapted to the overall shape and/or size of the corresponding battery module 20.

Further, in order to improve the reliability of fixing the battery cell 2 and prevent the battery cell 2 from shaking, an adhesive layer is provided between the bottom surface of each battery module 20 and the inner bottom surface of the box body 11; and/or an adhesive layer is provided between two adjacent battery units 2 in the battery module 20; and/or an adhesive layer is provided between the top surface of each battery module 20 and the constraint component 3.

Figure 3:
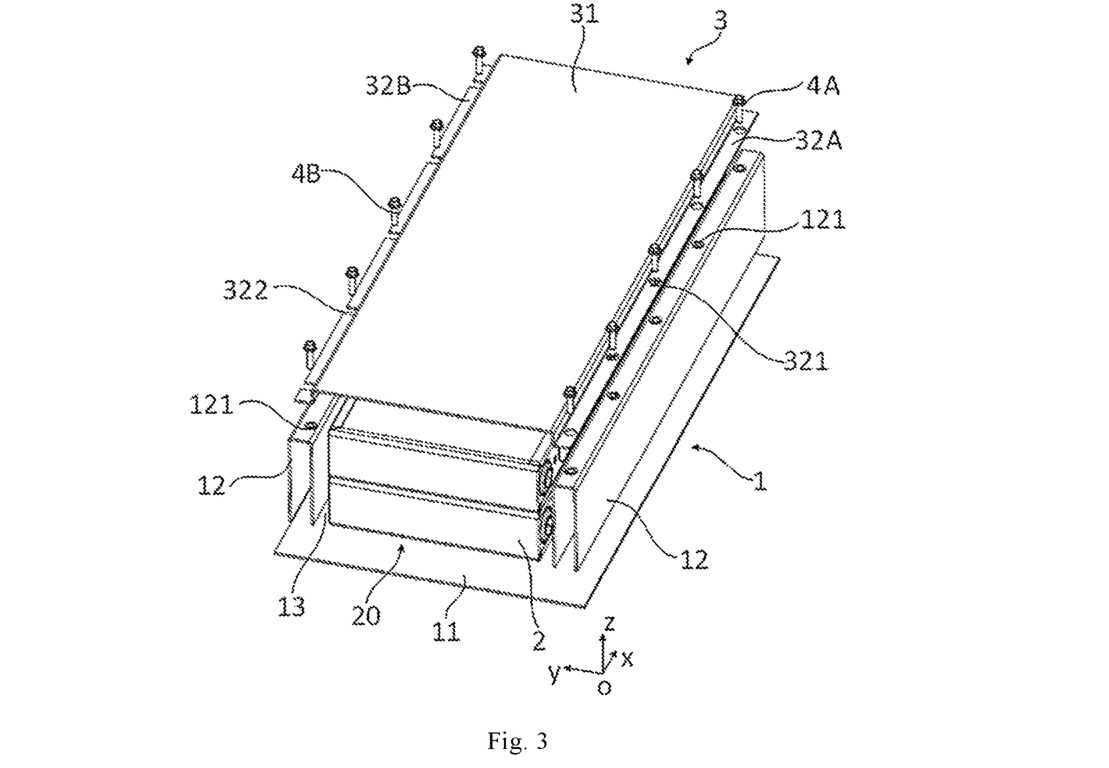
FIG. 3 is an exploded view of a battery pack according to some embodiments of the present disclosure, in which a constraint component is mounted with a fixed beam.
Figure 4:
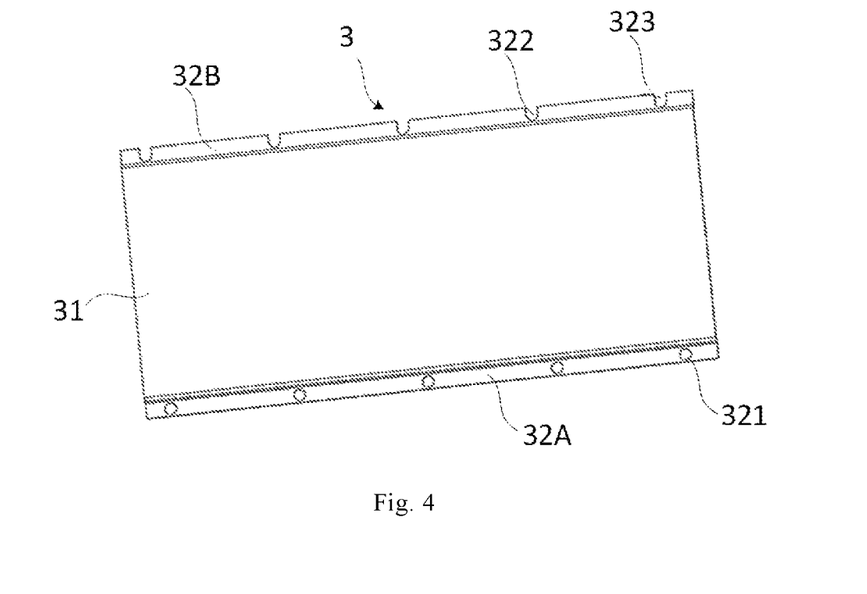
FIG. 4 is a schematic structural view of a constraint component in FIG. 3 according to some embodiments.

As shown in FIGS. 2 to 4, each of the constraint component 3 includes a limiting portion 31, a first mounting portion 32A, and a second mounting portion 32B. The limiting portion 31 correspondingly covers battery modules 20 and may be in contact with and maintained with a gap from the battery cell 2 in the uppermost layer. The first mounting portion 32A and the second mounting portion 32B are respectively connected to both sides of the limiting portion 31 along an arrangement direction of the plurality of fixed beams 12, and are respectively fixed to the fixed beams 12 at both sides of the corresponding battery module 20. The constraint component 3 covers the battery cell 2.

The first mounting portion 32A is provided with a plurality of first mounting holes 321 at intervals along the length direction of the fixed beam 12, and the second mounting portion 32B is provided with a plurality of second mounting holes 322 at intervals along the length direction of the fixed beam 12. The first fasteners 4A respectively pass through the corresponding first mounting hole 321 and are fixed to the fixed beam 12 corresponding to the first mounting portion 32A, and the second fasteners 4B respectively pass through the corresponding second mounting hole 322 and are fixed to the fixed beam 12 corresponding to the second mounting portion 32B. Wherein, the first mounting hole 321 and the second mounting hole 322 have different adjustment amounts in the arrangement direction of the plurality of fixed beams 12, that is in the arrangement direction of the plurality of fixed beams 12, a movement amount of the first fastener 4A in the first mounting hole 321 is different from that of the second fastener 4B in the second mounting hole 322, so as to allow for a fitting error resulting from machining and assembly. For example, the first fastener 4A and the second fastener 4B may be screws, bolts, rivets, or the like.

The battery pack of this embodiment of the present disclosure may provide a stable and effective pressing force to the battery modules 20 and reduces the expansion and deformation degree of the battery module 20 when the battery module 20 expands, by providing the constraint component 3 fixed to the fixed beam 12.

Moreover, the first mounting hole 321 and the second mounting hole 322 on both sides of the constraint component 3 are provided with different adjustment amounts. When the constraint component 3 is mounted on the fixed beam 12, it is possible to solve the problem of a difficult assembly resulting from a fitting error between the constraint component 3 and the fixed beam 12, thereby improving the assembly efficiency of the battery pack, and reducing the requirements for the accuracy of machining parts to reduce the production cost. In addition, it is also possible to release a connection stress produced between the fastener and the mounting hole, thereby preventing deformation of the battery pack when subjected to an assembly stress.

In addition, two adjacent battery modules 20 are spaced apart by the fixed beam 12, when some of the battery modules 20 produce a large amount of heat during operation so that thermal runaway occurs, it is possible to delay the diffusion of heat to other battery modules 20 and improve the operational safety of the battery pack.

In some embodiments, as shown in FIGS. 2 to 4, the first mounting hole 321 is a circular hole, and the second mounting hole 322 is provided with an opening 323 away from the limiting portion 31. The opening 323 penetrates in the thickness direction of the second mounting portion 32B, and the size of the opening 323 in the length direction of the fixed beam 12 is no smaller than a diameter of a first connecting section 41 of the second fastener 4B, so that the first connecting section 41 can move along the arrangement direction (y direction) of the plurality of fixed beams 12 within the opening 323 when there is a fitting error, thereby releasing an assembly stress. For example, the second mounting hole 322 includes a semi-circular hole and straight extending sections tangent to two open ends of the semi-circular hole respectively, wherein the two straight extending sections form the opening 323.

This structure can maximize the adjustment amount of the constraint component 3 during assembly and may allow a greater fitting error in a box when the width of the second mounting portion 32B along the arrangement direction of the plurality of fixed beams 12 is determined. Moreover, it is easier to machine such second mounting hole 322.

Figure 6:
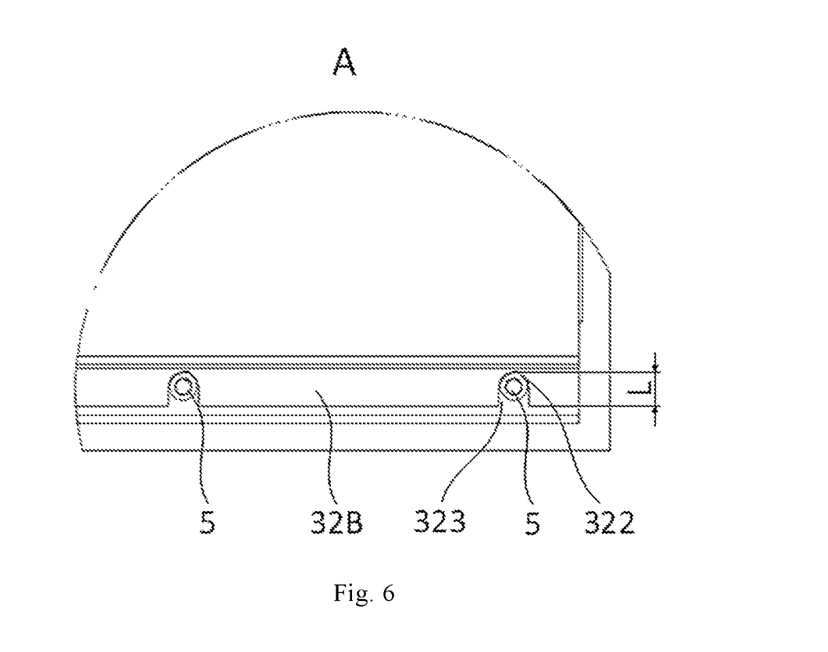
FIG. 6 is an enlarged view at A in FIG. 5.
Figure 7:
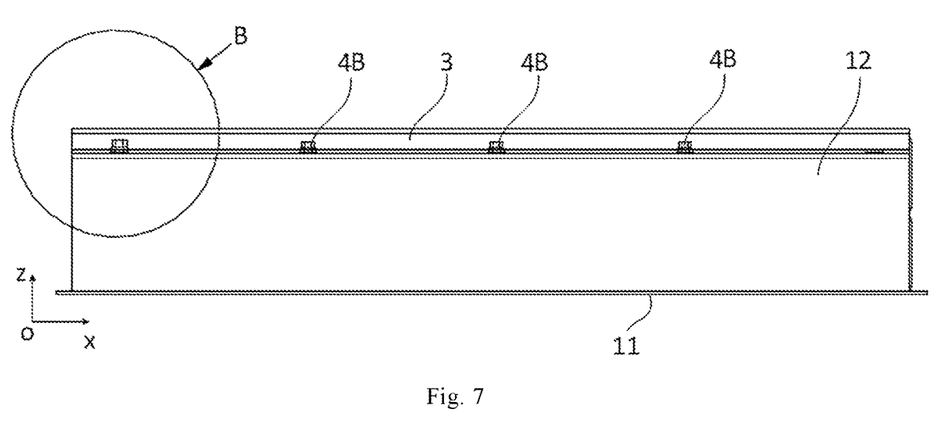
FIG. 7 is a side view of a battery pack according to some embodiments of the present disclosure, in which a constraint component is mounted on a fixed beam.

As shown in FIG. 6, the distance L between the section of the second mounting hole 322 close to the limiting portion 31 and the side of the second mounting portion 32B away from the limiting portion 31 is greater than the diameter of the first connecting section 41 of the second fastener 4B, that is, a length size L of the second mounting hole 322 along the arrangement direction of the plurality of fixed beams 12 is greater than the diameter of the first connecting section 41 of the second fastener 4B. In this way, when the first connecting section 41 is moved between the two straight extending sections of the second mounting hole 322 due to a fitting error, it is possible to maintain a maximum contact area between a first limiting portion 42 of the second fastener 4B and the top surface of the second mounting portion 32B, so as to increase a pressing force, thereby improving the connection strength between the constraint component 3 and the fixed beam 12.

In some embodiments, a diameter of the first mounting hole 321 is the same as that of the arcuate section of the second mounting hole 322. Therefore, the first fasteners 4A and the second fasteners 4B may use the same diameter size to improve the assembly efficiency, and allow a uniform stress on both sides of the constraint component 3 when the constraint component 3 is fixed to the fixed beam 12. Alternatively, the diameter of the first mounting hole 321 is different from the same of the arcuate section of the second mounting hole 322.

Figure 5:
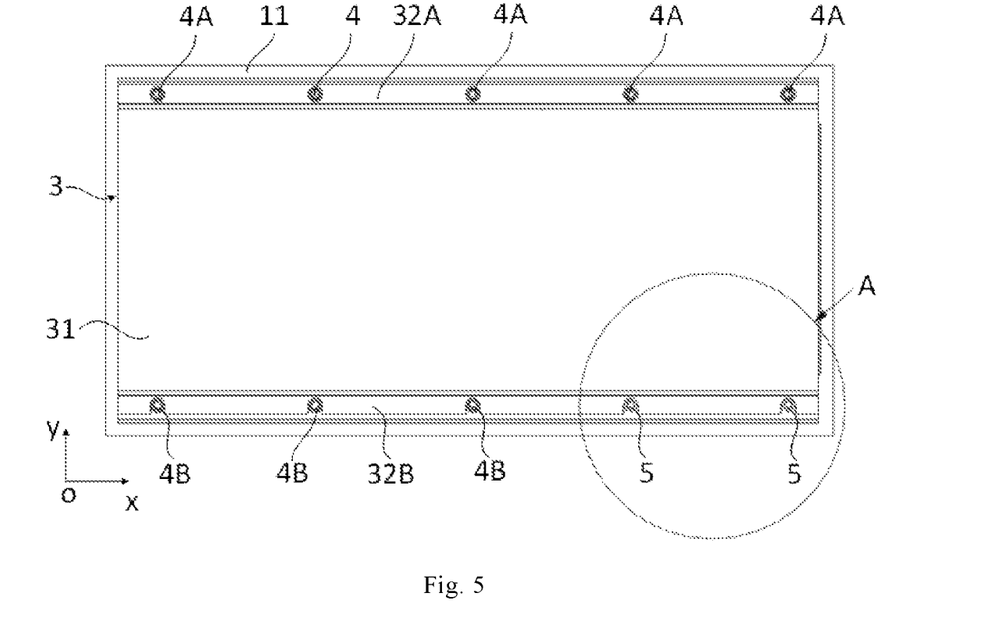
FIG. 5 is a top view of a battery pack according to some embodiments of the present disclosure, in which a constraint component is mounted on a fixed beam.

As shown in FIG. 5, the first mounting holes 321 are arranged at equal intervals along the extending direction of the fixed beam 12, and the second mounting holes 322 are arranged at equal intervals along the extending direction of the fixed beam 12, so as to allow a uniform stress at various locations when the constraint component 3 is fixed to the fixed beam 12, thereby fixing the constraint component 3 reliably. Alternatively, the intervals between the respective first mounting holes 321 along the extending direction of the fixed beam 12 may also be different, and the intervals between the respective second mounting holes 322 along the extending direction of the fixed beam 12 may also be different.

In some fixing manners, referring to FIG. 3, the fixed beam 12 is provided with a plurality of third mounting holes 121 at intervals along the length direction thereof, and the third mounting holes 121 are threaded holes. The plurality of first fasteners 4A sequentially pass through the first mounting holes 321 and the third mounting hole 121 and are fixed to the fixed beam 12 corresponding to the first mounting portion 32A, and/or the plurality of second fastener 4B sequentially pass through the second mounting hole 322 and the third mounting hole 121 and are fixed to the fixed beam 12 corresponding to the second mounting portion 32B. It is easy to machine such third mounting hole 121, and since the threaded hole is directly opened in the fixed beam 12, the connection strength between the constraint component 3 and the fixed beam 12 may be improved, so as to provide a more effective restraint on the battery module 20.

In other fixing manners, as shown in FIG. 3, the fixed beam 12 is formed by folding a sheet metal structure, or as shown in FIG. 11, the fixed beam 12 is provided with a weight reduction slot 122, so that the top surface of the fixed beam 12 forms a thin wall structure, and it is not easy to open a threaded hole directly.

Figure 8:
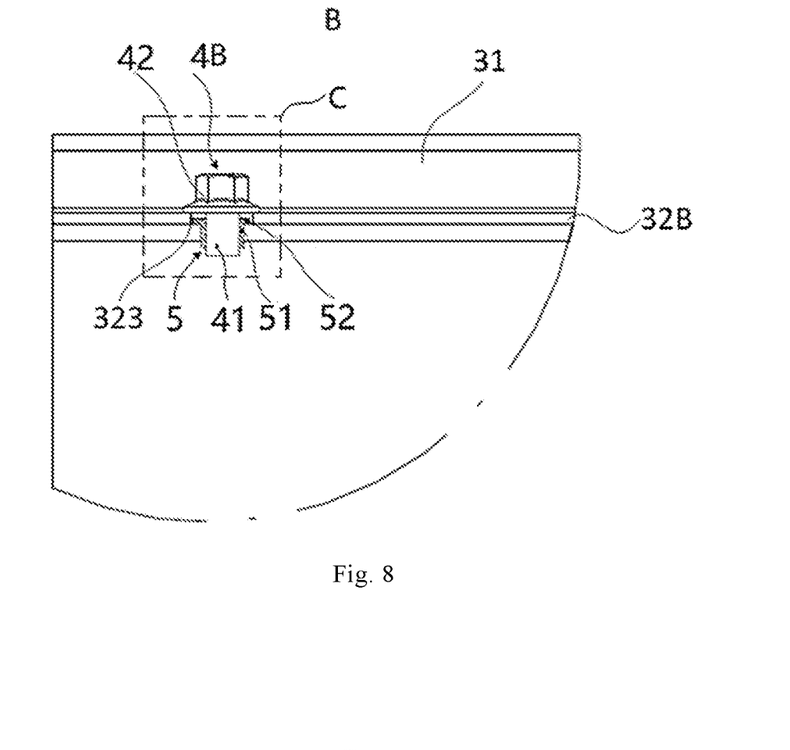
FIG. 8 is an enlarged view at B in FIG. 7.
Figure 9:
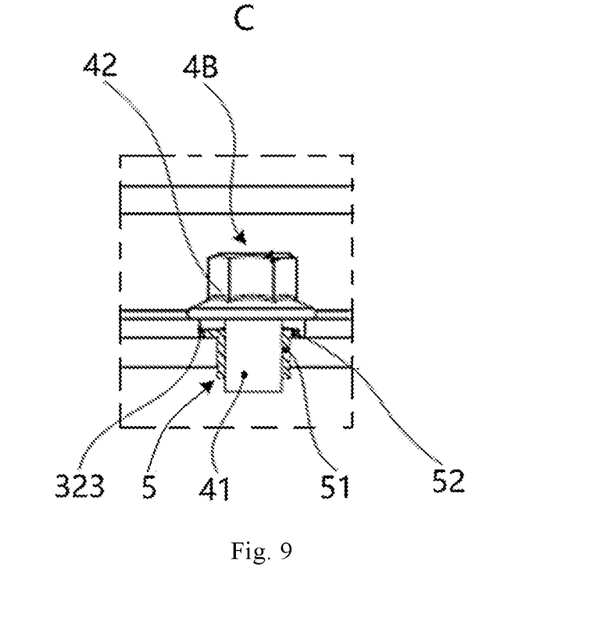
FIG. 9 is an enlarged view at C in FIG. 8.

For this reason, as shown in FIGS. 5 and 6, the fixed beam 12 is provided with a plurality of third mounting holes 121 at intervals along the length direction thereof, and the third mounting holes 121 are through holes. The battery pack also includes a plurality of blind rivet nuts 5, as shown in FIGS. 8 and 9, the blind rivet nuts 5 include a second connecting section 51 and a second limiting portion 52. The second connecting section 51 of each blind rivet nut 5 is correspondingly inserted into each third mounting hole 121 and connected to the third mounting hole 121 respectively. The bottom of the second limiting portion 52 is in contact with the top surface of the fixed beam 12, and the outer periphery of the second limiting portion 52 may be circular or hexagonal and the like.

The first fasteners 4A sequentially pass through the first mounting hole 321 and inner holes of the blind rivet nut 5 and are fixed to the corresponding fixed beam 12 corresponding to the first mounting portion 32A, and/or the plurality of second fasteners 4B sequentially pass through the second mounting holes 322 and inner holes of the blind rivet nut 5 and are fixed to the fixed beam 12 corresponding to the second mounting portion 32B.

When the fixed beam 12 is a thin wall structure, the length of the threaded hole may be increased by providing a blind rivet nut 5 on the fixed beam 12, so that it is possible to reduce the weight of the box assembly 1 and reliably fix the beam member 3 on the fixed beam 12.

As shown in FIG. 6, the diameter of the first mounting hole 321 and the diameter of the arcuate section of the second mounting hole 322 are both greater than a profile size of the second limiting portion 52. Therefore, when the constraint component 3 is mounted on the fixed beam 12, the first mounting hole 321 and the second mounting hole 322 may be avoided from the second limiting portion 52, so that the first mounting portion 32A and the second mounting portion 32B are both in full contact with the top surface of the fixed beam 12 and there is a more uniform stress.

Figure 10:
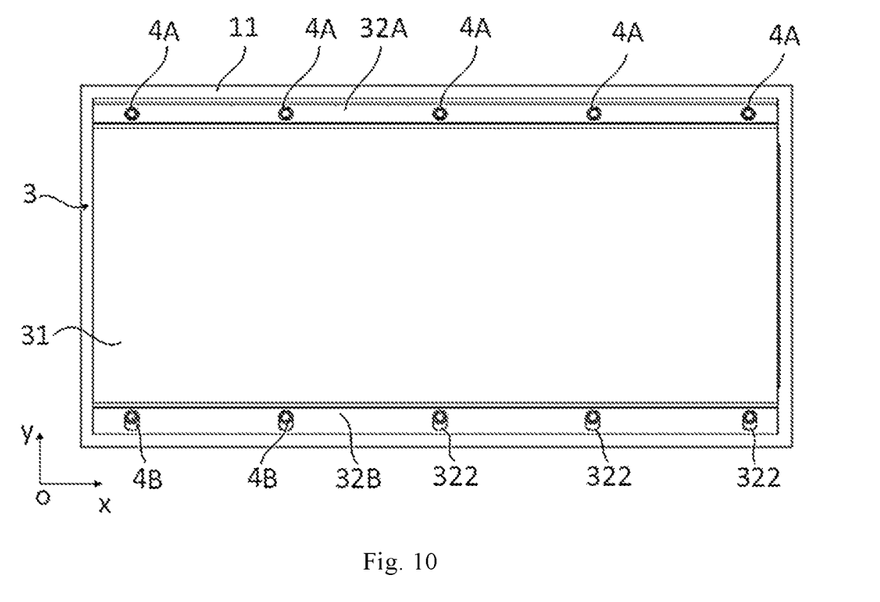
FIG. 10 is a top view of a battery pack according to other embodiments of the present disclosure, in which a constraint component is mounted on a fixed beam.

In other embodiments, as shown in FIG. 10, the first mounting hole 321 is a circular hole, and the second mounting hole 322 is an oblong hole extending along the arrangement direction of the plurality of fixed beams 12. Affected by the fitting dimensions of the parts, the first connecting section 41 of the second fastener 4B may be located at any position of the oblong hole along the extending direction.

This structure can limit the second fastener 4B from disengagement from the second mounting hole 322 and ensure the connection strength of the second fastener 4B with the constraint component 3 and the fixed beam 12 in the case of ensuring the adjustment amount of the constraint component 3 during assembly to allow machining and assembly errors. Moreover, since the lateral surface of the second mounting portion 32B away from the limiting portion 31 is enclosed along the extending direction of the entire fixed beam 12, the overall strength of the constraint component 3 may be improved, thereby preventing deformation of the constraint component 3.

After the connection manner of the single constraint component 3 and the fixed beam 12 is described, since the battery pack is generally provided with a plurality of battery modules 20, a plurality of constraint components 3 are also provided correspondingly.

In one structural form, the width of the fixed beam 12 is no less than the width of two first mounting portions 32A, two second mounting portions 32B, or a sum of the first mounting portions 32A and the second mounting portions 32B, so that each constraint component 3 is independently mounted on the corresponding fixed beams 12 respectively.

In another structure, as shown in FIGS. 11 to 15, for two adjacent constraint components 3, the first mounting portion 32A of one of the constraint components 3 and the second mounting portion 32B of another constraint component 3 are fixed to the same fixed beam 12 by the same group of first fasteners 4A or second fasteners 4B, and stacked in the height direction (z direction).

In this structure, the first fasteners 4A pass through the first mounting hole 321 and the second mounting hole 322 at the same time, and the second fasteners 4B also pass through the first mounting hole 321 and the second mounting hole 322 at the same time. Therefore, FIGS. 11, 13 to 15 will no longer distinguish the first fastener 4A and the second fastener 4B, which will be collectively marked as the first fastener 4A.

By fixing two adjacent constraint components 3 on the same fixed beam 12, the number of the fixed beams 12 may be reduced, which may simplify the structure of the box assembly 1, and reduce the width occupied by the fixed beams 12 within the horizontal plane. Moreover, the first mounting portion 32A and the second mounting portion 32B fixed on the same fixed beam 12 are stacked in the height direction, which can further reduce the width occupied by the fixed beams 12 within the horizontal plane. Further, the number of fasteners needed to lock a single battery module 20 can meet the locking requirements of adjacent battery modules 20, which may improve the energy density and space utilization of the battery pack, and improve the assembly efficiency of the constraint component 3 and the fixed beam 12.

Moreover, since the first mounting hole 321 and the second mounting hole 322 have different adjustment amounts, it is also possible to smoothly pass the first fastener through the first mounting hole 321 and the second mounting hole 322 at the same time, and may reduce the influence of the tolerance of machining the parts on the constraint component 3 and the fixed beam 12 during assembly, and it is easy to mount the first fastener 4A, when the first mounting portion 31A and the second mounting portion 32B of two adjacent constraint components 3 are stacked in the height direction.

As shown in FIG. 11, the first mounting portion 32A is located above the second mounting portion 32B stacked with the first mounting portion 32A in the height direction. Since the first mounting portion 32A is provided with a circular hole, the first mounting portion 32A is placed above the second mounting portion 32B, so that the first limiting portion 42 of the first fastener 4A may be adequately contact with the top surface of the first mounting portion 32A in the entire circumferential direction, so as to allow a more uniform stress, and so that the force is more uniform, and a reliable connection between the constraint component 3 and the fixed beam 12, thereby improving a solid connection between two adjacent constraint components 3 and the fixed beam 12. Alternatively, the first mounting portion 32A may also be located below the second mounting portion 32B stacked with the first mounting portion 32A in the height direction.

There are at least two implementation structures for fixing two adjacent constraint components 3 on the same fixed beam 12.

Figure 12:
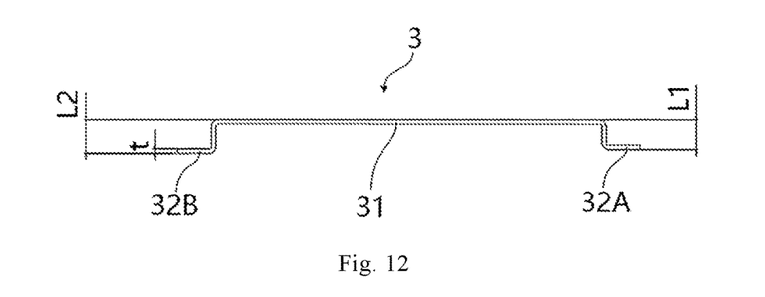
FIG. 12 is a front view of a constraint component in FIG. 11 according to some embodiments.

In one structure, as shown in FIG. 12, there is a first distance L1 between the bottom surface of the first mounting portion 32A and the top surface of the limiting portion 31, and there is a second distance L2 between the bottom surface of the second mounting portion 32B and the top surface of the limiting portion 31; wherein the second distance L2 is greater than the first distance L1. When two adjacent constraint components 3 are fixed on the same fixed beam 12, the second mounting portion 32B is located at the bottom of the first mounting portion 32A.

In this embodiment, the first mounting portion 32A of one of the constraint components 3 can be stacked with the second mounting portion 32B of the other constraint component 3 in the height direction when two adjacent constraint components 3 are mounted on the same fixed beam 12, by providing a height difference between the first mounting portion 32A and the second mounting portion 32B of the constraint component 3. Moreover, each constraint component 3 in the battery pack which has the same structure and uses the same assembly direction, may lessen the types of parts and reduce the difficulty of assembly.

In some embodiments, as shown in FIG. 12, the thickness of the second mounting portion 32B is t, which satisfies L2−L1≥t.

If L1−L2=t, the first mounting portion 32A and the second mounting portion 32B of two adjacent constraint components 3 are exactly in direct contact with each other, and there is no need to use an adjustment gasket, so that the assembling process may be simplified.

If L2−L1>t, there is a gap between the first mounting portion 32A and the second mounting portion 32B of two adjacent constraint components 3, and an adjustment gasket is provided between the first mounting portion 32A and the second mounting portion 32B according to the size of the gap, so that the first mounting portion 32A is in reliable contact with the second mounting portion 32B, thereby improving a solid fixation of each constraint component 3 with the fixed beam 12.

As shown in FIG. 1, seven fixed beams 12 are provided within the box body 11 at intervals along the length direction (x direction), and the accommodating cavity 13 is formed between two adjacent fixed beams 12. Each accommodating cavity 13 is provided with a battery module 20, and the box body 11 is provided with six battery modules 20 in total.

Each battery module 20 is provided with two layers of battery units 2 along the height direction, and each layer of battery units 2 includes a plurality of battery units 2 arranged along the width direction (y direction). The limiting portion 31 of the constraint component 3 covers the uppermost layer battery cells 2 in the corresponding battery module 20. Alternatively, the fixed beam 12 may be arranged along the width direction of the box body 11.

Figure 13:
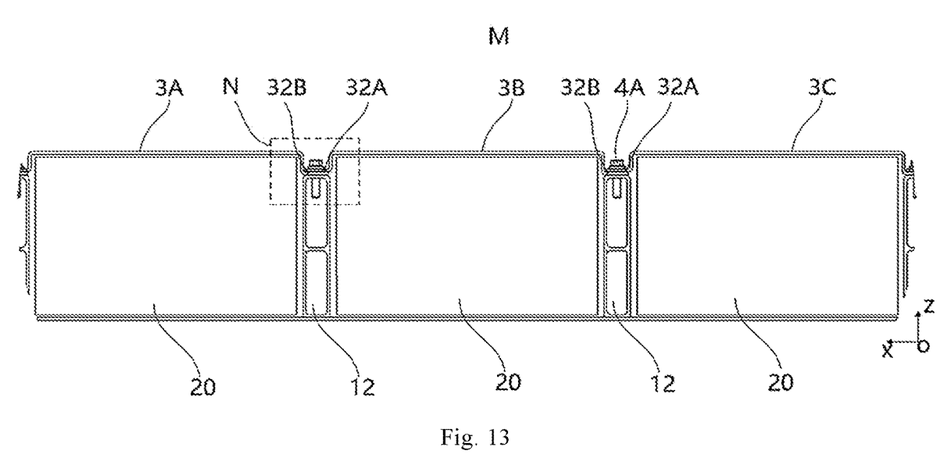
FIG. 13 is an enlarged view at M in FIG. 1.
Figure 14:
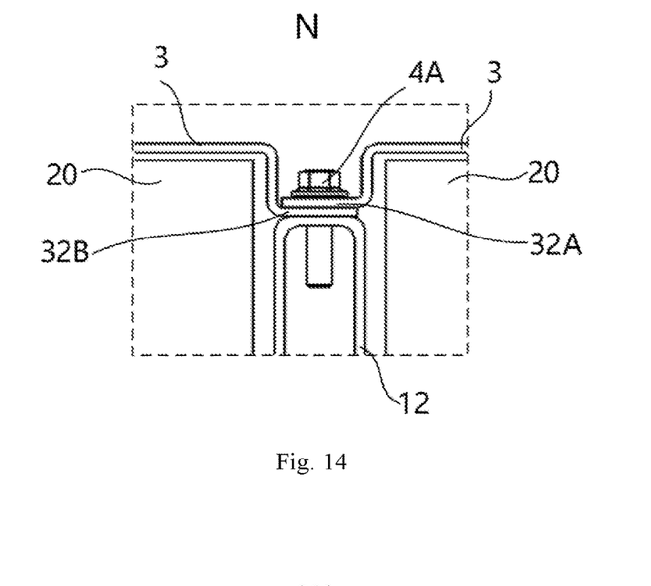
FIG. 14 is an enlarged view at N in FIG. 13.

In order to reflect the installation relationships between the respective constraint components 3 more clearly, as shown in FIG. 13, the installation of three adjacent constraint components 3 will be taken as an example for description, and the installation forms of the remaining constraint components 3 are similar thereto.

Specifically, three adjacent constraint components 3 in the battery pack 100 are respectively a first constraint component 3A, a second constraint component 3B, and a third constraint component 3C, which are sequentially provided along the arrangement direction of the plurality of fixed beams 12. Wherein, as shown in FIG. 13, the second mounting portion 32B of the first constraint component 3A is located below the first mounting portion 32A of the second constraint component 3B, and the second mounting portion 32B of the second constraint component 3B is located below the first mounting portion 32A of the third constraint component 3C. In such battery pack 100, each first mounting portion 32A is located above the second mounting portion 32B stacked with the first mounting portion 32A in the height direction.

Figure 15:
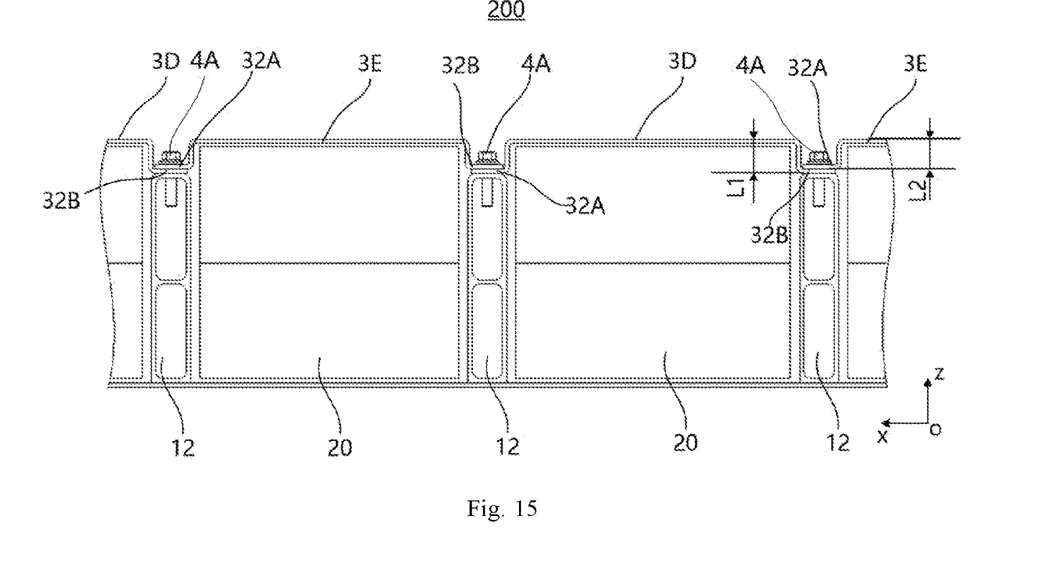
FIG. 15 is an exploded view of a battery pack according to other embodiments of the present disclosure, in which a first mounting portion and a second mounting portion of adjacent constraint components are stacked in a height direction.

In another structure, as shown in FIG. 15, in the battery pack 200, two adjacent constraint components 3 are a fourth constraint component 3D and a fifth constraint component 3E respectively. In the fourth constraint component 3D, there is a first distance L1 between the bottom surface of the first mounting portion 32A and the top surface of the limiting portion 31, and there is a first distance L1 between the bottom surface of the second mounting portion 32B and the top surface of the limiting portion 31. In the fifth constraint component 3E, there is a second distance L2 between the bottom surface of the first mounting portion 32A and the top surface of the limiting portion 31, and there is a second distance L2 between the bottom surface of the second mounting portion 32B and the top surface of the limiting portion 31.

Wherein, the fourth constraint components 3D and the fifth constraint components 3E are alternately arranged along the arrangement direction of the plurality of fixed beams 12, and the first distance L1 is greater than the second distance L2.

Specifically, four adjacent constraint components 3 are respectively a fourth constraint component 3D, a fifth constraint component 3E, a fourth constraint component 3D, and a fifth constraint component 3E, which are sequentially provided along the arrangement direction of the plurality of fixed beams 12. As shown in FIG. 15, from the left, the first mounting portion 32A of the leading fifth constraint component 3E is located above the second mounting portion 32B of the fourth constraint component 3D on the left side; the second mounting portion 32B of the leading fifth constraint component 3E is located above the first mounting portion 32A of the fourth constraint component 3D on the right side; the first mounting portion 32A of the next fifth constraint component 3E is located above the second mounting portion 32B of the fourth constraint component 3D on the left side; and so forth.

In the height direction, the first mounting portion 32A and the second mounting portion 32B of each fourth constraint component 3D are both stacked on the first mounting portion 32A and the second mount portion 32B of the fifth constraint component 3E adjacent on both sides.

Although this embodiment is provided with constraint components 3 of two sizes, there are no requirements for the directions of the fourth constraint component 3D and the fifth constraint component 3E during assembly, which may reduce the difficulty of assembly and improve the efficiency of assembly. Moreover, when the battery module 20 covered by the fifth constraint component 3E is malfunctioned, the battery module 20 can be replaced or repaired by simply removing the corresponding fifth constraint component 3E; when the battery module 20 covered by the fourth constraint component 3D is malfunctioned, the battery module 20 can be replaced or repaired by removing the fifth constraint component 3E adjacent on both sides of the fourth constraint component 3D. Therefore, it is possible to improve a convenient and efficient maintenance of the battery module 20 in the battery pack.

The structure that may be used by the battery cell 2 in the above-described embodiments will be provided below.

Figure 16:
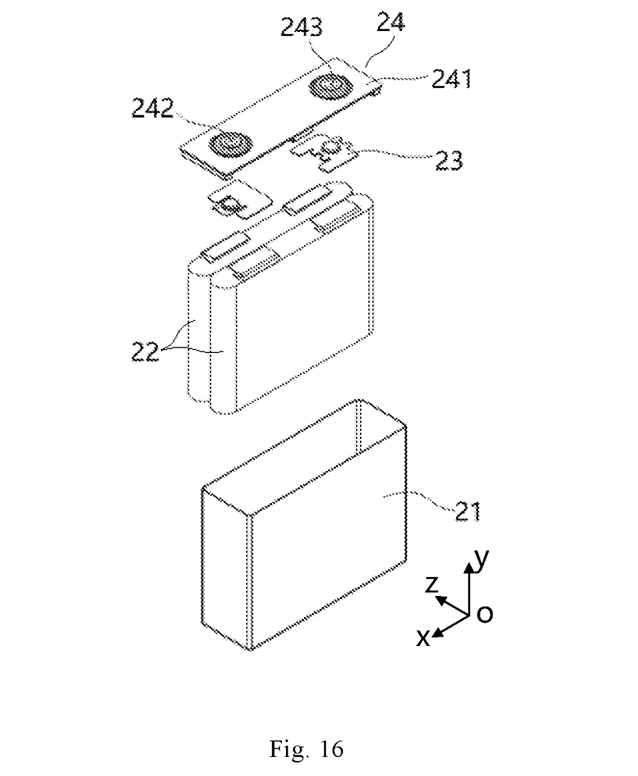
FIG. 16 is an exploded view of a battery cell according to some embodiments.

As shown in the exploded view shown in FIG. 16, each battery cell 2 includes: a shell 21 and an electrode assembly 22 arranged in the shell 21. The shell 21 may have a hexahedron shape or other shapes and has an opening. The electrode assembly 22 is accommodated within the shell 21. The opening of the casing 21 is covered with a cover plate assembly 24. The cover plate assembly 24 includes a cover plate 241 and two electrode terminals provided on the cover plate. The two electrode terminals are a first electrode terminal 242 and a second electrode terminal 243 respectively. Wherein, the first electrode terminal 242 may be an anode terminal, and the second electrode terminal 243 may be a cathode terminal. In other embodiments, the first electrode terminal 242 may also be a cathode terminal, and the second electrode terminal 243 is an anode terminal. An adapter piece 23 is provided between the outer cover plate assembly 24 and the electrode assembly 22. The tab of the electrode assembly 22 is electrically connected to the electrode terminal on the cover plate 241 through the adapter piece 23. In this embodiment, there are two adapter pieces 23, i.e., a positive adapter piece and a negative adapter piece respectively.

As shown in FIG. 16, the shell 21 is internally provided with two electrode assemblies 22 which are stacked along the height direction (z direction) of the battery cell 2, wherein the height direction of the battery cell 2 conforms to that of the battery pack. Of course, in other embodiments, the shell 21 may be internally provided with one electrode assembly 22, or the shell 21 may be internally provided with three or more electrode assemblies 22. The plurality of electrode assemblies 22 are stacked along the height direction (z direction) of the battery cell 2.

Figure 17:
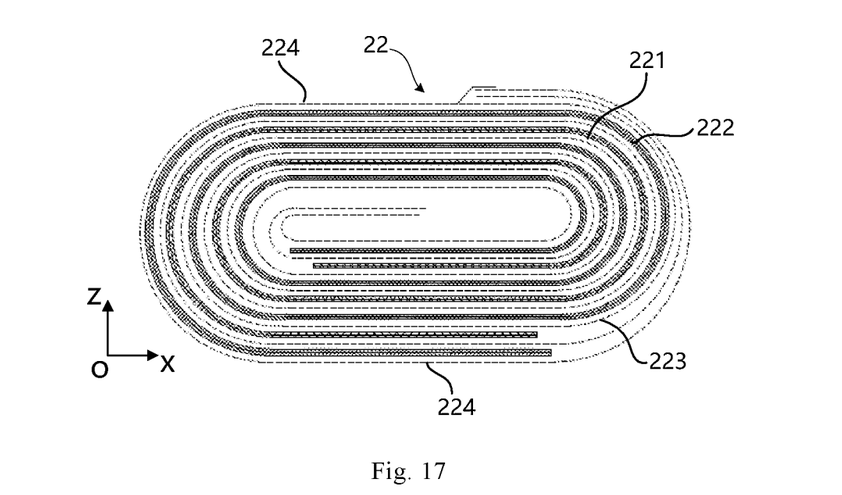
FIG. 17 is a cross-sectional view of a battery cell using a wound electrode assembly along the xz plane.
Figure 18:
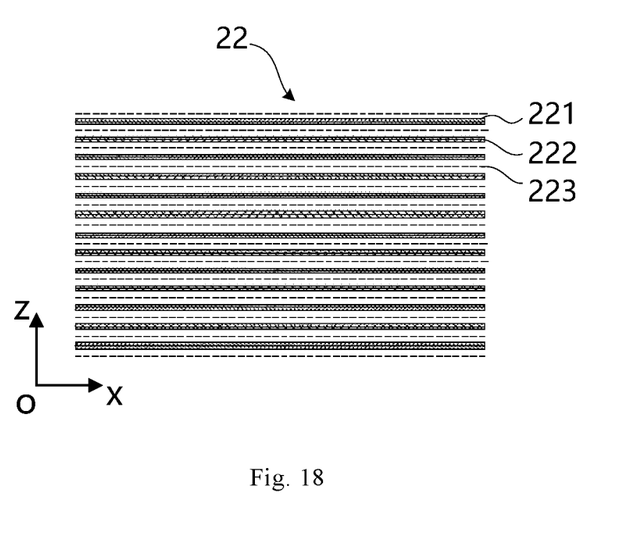
FIG. 18 is a cross-sectional view of a battery cell using a laminated electrode assembly along the xz plane.

As shown in FIGS. 17 and 18, the electrode assembly 22 includes a first pole piece 221, a second pole piece 222, and a diaphragm 223 arranged between the first pole piece 221 and the second pole piece 222. Wherein, the first electrode piece 221 may be an anode piece, and the second electrode piece 222 may be a cathode piece. In other embodiments, the first pole piece 221 may also be a negative pole piece, and the second pole piece 222 is a positive pole piece. The diaphragm 223 is an insulator between the first pole piece 221 and the second pole piece 222. The active material of the anode piece may be coated on the coating area of the anode piece, and the active material of the cathode piece may be coated on the coating area of the cathode piece. The portion extending from the coating area of the anode piece is used as the anode tab; the portion extending from the coating area of the cathode piece is used as the cathode tab. The anode tab is connected to the anode terminal on the cover plate assembly 24 through the anode adapter piece. Similarly, the cathode tab is connected to the cathode terminal on the cover plate assembly 24 through the cathode adapter piece.

As shown in FIG. 17, the electrode assembly 22 has a wound structure. Wherein, the first pole piece 221, the diaphragm 223, and the second pole piece 222 are all strip-like structures. The first pole piece 221, the diaphragm 223, and the second pole piece 222 are sequentially stacked and wound for two or more turns to form the electrode assembly 22 which is in a flat shape. When the electrode assembly 22 is manufactured, the electrode assembly 22 may be directly wound into a flat shape, or may also be first wound into a hollow cylindrical structure, and then flattened into a flat shape after winding. FIG. 15 is a schematic view of a shape profile of the electrode assembly 22. The outer surface of the electrode assembly 22 includes two flat surfaces 224, which are oppositely arranged along the height direction (z direction) of the battery cell 2. Wherein, the electrode assembly 22 is substantially a hexahedron structure, and the flat surface 224 is substantially parallel to the winding axis and is the outer surface with a maximum area. The flat surface 224 which may be a relatively flat surface, is not required to be a pure plane.

As shown in FIG. 18, the electrode assembly 22 has a laminated structure. That is, the electrode assembly 22 includes a plurality of first pole pieces 221 and a plurality of second pole pieces 222, and a diaphragm 223 is disposed between the first pole piece 221 and the second pole piece 222. The first pole piece 221 and the second pole piece 222 are stacked in the height direction (z direction) of the battery cell 2.

The electrode assembly 22 may inevitably expand along the thickness direction of the pole piece during the charging and discharging process. The expansion amounts of the respective pole pieces are superimposed, so that the accumulated expansion amount in the height direction is greater than in other directions. The embodiments of the present disclosure may restrain at a direction of the battery cell 2 having a maximum expansion amount by increasing a site where the constraint component 3 is fixed to the box body 11, thereby preventing deformation of the battery pack and improving the service life of the battery pack.

The battery pack provided by the present disclosure has been introduced in detail above. Specific examples are applied herein to explain the principles and implementations of the present disclosure. The descriptions of the above embodiments are only intended to help understand the method and core idea of the present disclosure. It should be noted that for those of ordinary skill in the art, without departing from the principles of the present disclosure, several improvements and modifications may also be made to the present disclosure, and these improvements and modifications also fall within the protection scope of the claims of the present disclosure.

What is claimed is:

1. A battery pack, comprising:
   a box assembly, comprising a box body and a plurality of fixed beams, wherein the plurality of fixed beams are fixed in the box body and divide the box body into a plurality of accommodation cavities;
   a plurality of battery modules, each of which comprises a plurality of battery units, and the plurality of battery modules are respectively arranged in the plurality of accommodation cavities;
   a plurality of constraint components, each of which comprises a limiting portion, a first mounting portion, and a second mounting portion, wherein the limiting portion covers one of the plurality of battery modules, and the first mounting portion and the second mounting portion are respectively connected to both sides of the limiting portion along an arrangement direction of the plurality of fixed beams, and are respectively fixed to two of the plurality of fixed beams at both sides of the one of the plurality of battery module; wherein the first mounting portion is provided with a plurality of first mounting holes at intervals along a length direction of the plurality of fixed beams, and the second mounting portion is provided with a plurality of second mounting holes at intervals along the length direction of the plurality of fixed beams;
   a plurality of first fasteners, which respectively pass through the first mounting holes and are fixed to one of the two of the plurality of fixed beam corresponding to the first mounting portion; and
   a plurality of second fasteners, which respectively pass through the second mounting holes and are fixed to the other of the two of the plurality of fixed beam corresponding to the second mounting portion,
   wherein each of the plurality of first mounting holes and each of the plurality of second mounting holes have different adjustment amounts in the arrangement direction of the plurality of fixed beams.

2. The battery pack according to claim 1, wherein each of the plurality of first mounting holes is a circular hole, and each of the plurality of second mounting holes is provided with an opening away from the limiting portion, wherein the opening penetrates in a thickness direction of the second mounting portion, and a size of the opening in the length direction of the plurality of fixed beams is no less than a diameter of a first connecting section of each of the plurality of second fasteners.

3. The battery pack according to claim 2, wherein a length size L of each of the plurality of second mounting holes along the arrangement direction of the plurality of fixed beams is greater than the diameter of the first connecting section of each of the plurality of second fasteners.

4. The battery pack according to claim 1, wherein a diameter of each of the plurality of first mounting holes is the same as that of an arcuate section of each of the plurality of second mounting holes.

5. The battery pack according to claim 1, wherein each of the plurality of first mounting hole is a circular hole, and each of the plurality of second mounting hole is an oblong hole extending along the arrangement direction of the plurality of fixed beams.

6. The battery pack according to claim 1, wherein each of the plurality of fixed beams is provided with a plurality of third mounting holes at intervals along the length direction thereof, and each of the plurality of third mounting holes is a threaded hole; and
   wherein each of the plurality of first fasteners sequentially passes through one of the plurality of first mounting holes and one of the plurality of third mounting holes and is fixed to one of the plurality of fixed beams corresponding to the first mounting portion.

7. The battery pack according to claim 1, wherein each of the plurality of fixed beams is provided with a plurality of third mounting holes at intervals along the length direction thereof, and each of the plurality of third mounting holes is a threaded hole; and wherein each of the plurality of second fasteners sequentially passes through one of the plurality of second mounting holes and one of the plurality of third mounting holes and is fixed to one of the plurality of fixed beams corresponding to the second mounting portion.

8. The battery pack according to claim 1, wherein each of the plurality of fixed beams is provided with a plurality of third mounting holes at intervals along the length direction thereof, wherein each of the plurality of third mounting holes is a through hole;

the battery pack comprising a plurality of blind rivet nuts which comprises a second connecting section and a second limiting portion, wherein the second connecting section of each of the plurality of blind rivet nuts is correspondingly embedded in each of the plurality of third mounting holes, and the second limiting portion is in contact with a side of the fixed beam facing the constraint component;

wherein each of the plurality of first fasteners sequentially passes through one of the plurality of first mounting holes and an inner hole of one of the plurality of blind rivet nuts, and is fixed to one of the plurality of fixed beams corresponding to the first mounting portion.

9. The battery pack according to claim 8, wherein a diameter of each of the plurality of first mounting holes is greater than a profile size of the second limiting portion.

10. The battery pack according to claim 1, wherein each of the plurality of fixed beams is provided with a plurality of third mounting holes at intervals along the length direction thereof, wherein each of the plurality of third mounting holes is a through hole;

the battery pack comprising a plurality of blind rivet nuts which comprises a second connecting section and a second limiting portion, wherein the second connecting section of each of the blind rivet nuts is correspondingly embedded in each of the third mounting holes, and the second limiting portion is in contact with a side of the fixed beam facing the constraint component;

wherein each of the plurality of second fasteners sequentially passes through one of the plurality of second mounting holes and an inner hole of one of the plurality of blind rivet nuts and is fixed to one of the plurality of fixed beams corresponding to the second mounting portion.

11. The battery pack according to claim 10, wherein a diameter of an arcuate section of each of the plurality of second mounting holes is greater than a profile size of the second limiting portion.

12. The battery pack according to claim 1, wherein for two adjacent constraint components, the first mounting portion of one constraint component and the second mounting portion of another constraint component are fixed to the same fixed beam through the same group of the first fasteners or second fasteners, and stacked in a height direction.

13. The battery pack according to claim 12, wherein the first mounting portion is located above the second mounting portion stacked with the first mounting portion in the height direction.

14. A device of using a secondary battery, and the secondary battery comprising the battery pack according to claim 1.

* * * * *